O. A. NELSON.
CABINET.
APPLICATION FILED MAR. 13, 1919.
1,341,994.
Patented June 1, 1920.
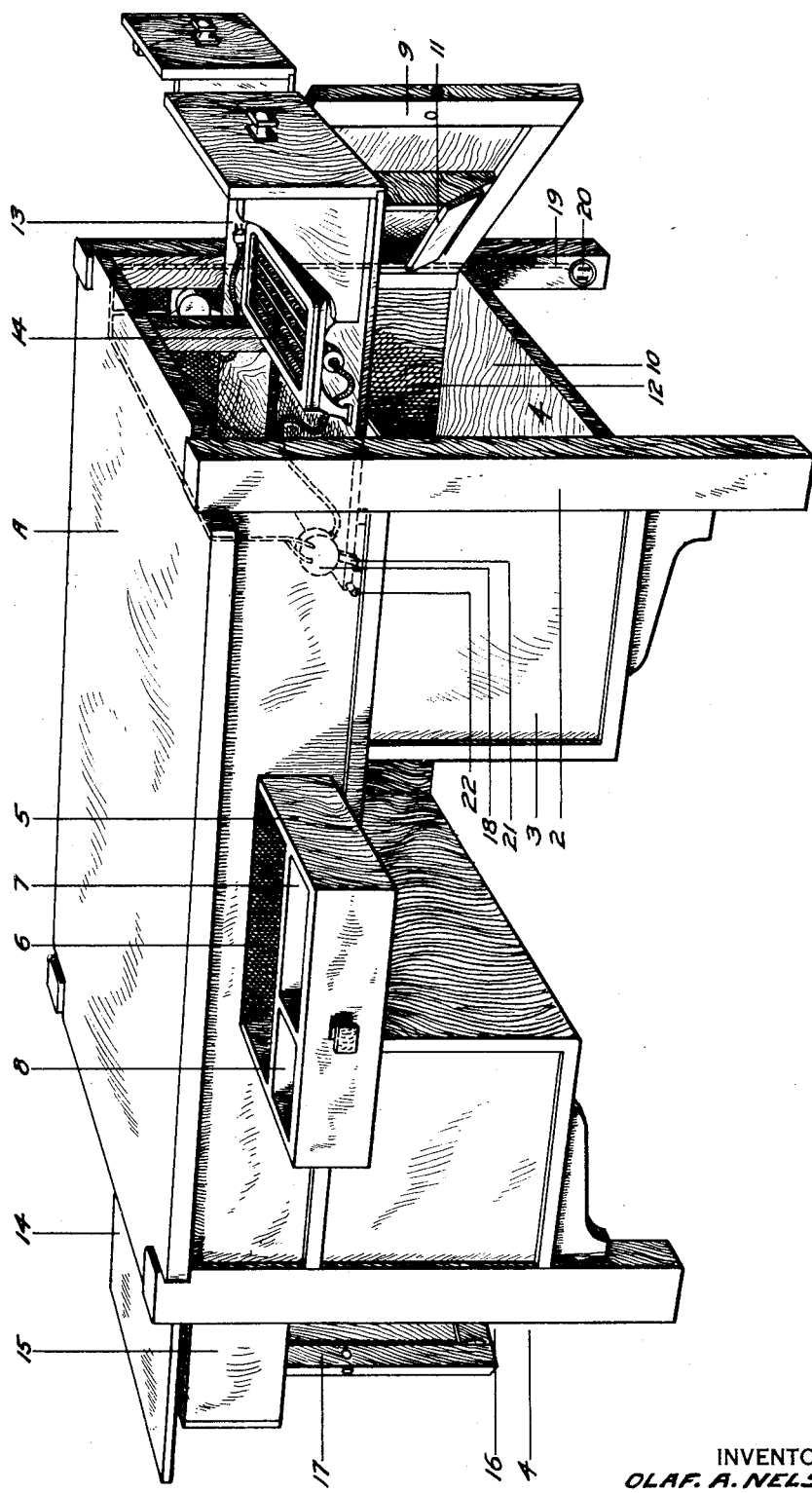
INVENTOR
OLAF. A. NELSON
BY
Strong & Townsend
ATTORNEY

UNITED STATES PATENT OFFICE.

OLAF A. NELSON, OF SAN FRANCISCO, CALIFORNIA.

CABINET.

1,341,994. Specification of Letters Patent. Patented June 1, 1920.

Application filed March 13, 1919. Serial No. 282,269.

*To all whom it may concern:*

Be it known that I, OLAF A. NELSON, a citizen of the United States, residing at San Francisco, in the county of San Francisco and State of California, have invented new and useful Improvements in Cabinets, of which the following is a specification.

This invention relates to a cabinet and particularly to that type of cabinet which may be termed a bachelor's cabinet.

One of the objects of the present invention is to provide a cabinet table, particularly adapted for small apartments and the like, which, from exterior appearance and finish, resembles a sitting room, or library, table, but in reality is a combination cabinet table and kitchen; that is, the table or cabinet is provided with extension leaves, slides, drawers, bins and lockers for the reception of an electric cooker or toaster, kitchen utensils such as pots and pans, table linen, napkins, silverware, dishes and food products of various kinds; in fact, anything required for light housekeeping.

Another object of the invention is to provide means for automatically closing an electric circuit through the cooker when the slide supporting the same is extended, and conversely to break the circuit through the electric cooker when the slide is returned to normal or closed position.

Further objects will hereinafter appear.

The invention consists of the parts and the construction, combination and arrangement of parts as hereinafter more fully described and claimed, having reference to the accompanying drawing, which is a perspective view of the cabinet table.

Referring to the drawings in detail, A indicates the top of the table; 2, legs of the usual construction, supporting the same; 3, the sides of the table; and 4, the end sections.

Placed in one or both sides of the table is a drawer 5 which may be divided into compartments such as shown at 6, 7 and 8. The compartment 6 may, for instance, be used for the reception of table linen, napkins and the like; the compartment 7 for silverware, and the compartment 8 for spices, such as salt and pepper.

Placed in one end of the table is a door 9 which serves as a closure for a cabinet or compartment 10 in which may be placed kitchen utensils such as pots and pans. Formed on the inner side of the door is a bin 11 for the reception of large spoons and other necessary articles. Mounted in the end of the table above the door 9 is a pair of extensible slides 12 and 13, and mounted on both or either of said slides is an electric cooker or toaster, as shown at 14. Supported in the opposite end of the table is an extensible leaf 14 and mounted below said leaf is a drawer 15 in which may be placed groceries or food products of various kinds. Positioned below the drawer 15 is a cabinet or compartment 16 which is normally closed by means of a door 17. This cabinet may also be employed for the storage of dishes of various kinds, and it can therefore be seen that practically everything required for light housekeeping may be contained in the various compartments and drawers with which the table is provided. It will also be seen that everything is conveniently arranged so as to be readily accessible.

Another feature of the present invention is the provision of an automatically actuated switch 18. The wires from this switch pass under the table top and down through one of the legs, as shown at 19, being there connected with a socket 20 which permits the insertion of a plug from any suitable lighting fixture or extension. The switch is provided with an arm 21 which extends downwardly into the path of travel of a stop member 22 secured on the inner end of the slide 12. This stop member engages the switch arm and throws the switch to on-position when the slide is extended. Conversely, stop 22 engages the handle when the slide is returned to normal closed position, thereby throwing the switch to off-position and rendering it impossible for anybody to move the cooker in under the table top without breaking the circuit therethrough. This is of considerable importance as it can readily be seen that a person performing light housekeeping of this nature might readily close the slide 12 without turning off the heater. This might prove more or less dangerous as it might possibly put the table on fire and it would at least burn out the coils and destroy the heater if the slide should be closed and the current left on. The automatic operation of the switch 18 eliminates this danger as it is impossible to maintain a circuit through the heater except when the slide is extended.

A cabinet or table constructed as here shown, will, when all the drawers and compartments are closed, resemble an ordinary sitting room, or library, table, and it may therefore be used to great advantage in small apartments that are not furnished with kitchenettes. No one entering a room containing a table or cabinet of this character would ever guess the nature or use of the same, and as it is ornamental in appearance, it should serve every purpose required.

While a more or less specific design and finish is here shown, I wish it understood that this may be changed to suit various installations and conditions. Similarly, that the materials and finish of the several parts employed may be such as the experience and judgment of the manufacturer may dictate.

Having thus described my invention, what I claim and desire to secure by Letters Patent is—

1. The combination with a table, of a leaf positioned below the table top and slidably mounted with relation thereto, an electric heating element supported by said leaf, and means actuated by the sliding movement of the leaf for opening or closing an electric circuit through the heating element.

2. The combination with a table, of a leaf mounted below the top of the table and slidably mounted with relation thereto, a heating element supported by said leaf, a switch member arranged adjacent the leaf, means connecting said switch with a source of electric current supply, means also connecting said switch with a heating element, and means controlled by the sliding movement of the leaf for opening or closing the circuit through the switch.

3. The combination with a table, of a leaf mounted below the top of the table and slidably mounted with relation thereto, a heating element supported by said leaf, a switch member arranged adjacent the leaf, means connecting said switch with a source of electric current supply, means also connecting said switch with the heating element, a handle on the switch and a stop member on the leaf adapted to engage the switch handle and close the circuit through the switch and the heating element when the leaf is extended, said stop member also adapted to engage the switch handle and break the circuit through the switch and heating element when the leaf is moved inwardly to normal closed position.

In testimony whereof I have hereunto set my hand in the presence of two subscribing witnesses.

OLAF A. NELSON.

Witnesses:
 JAS. O'MALLEY,
 A. K. DAGGETT.